June 15, 1965  R. E. FREDERICKSON  3,189,064
SAW CHAIN
Filed Oct. 15, 1962
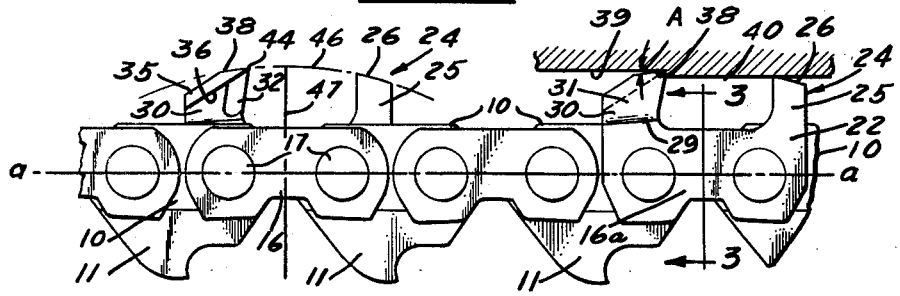
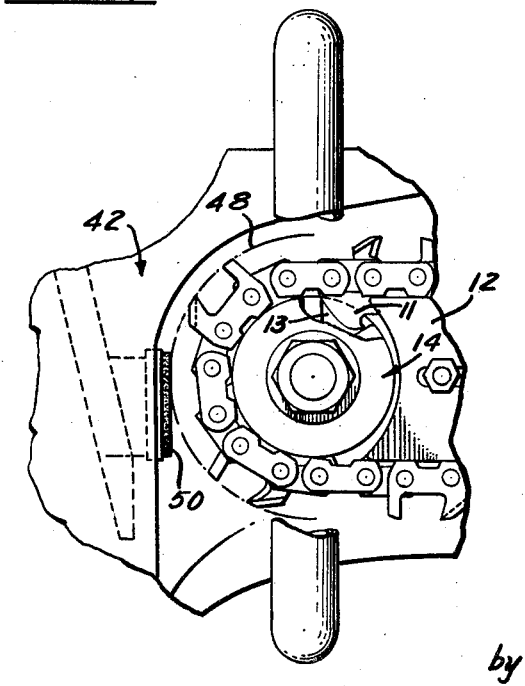
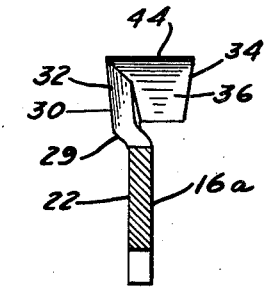
Robert E. Frederickson,
INVENTOR.
WHANN & McMANIGAL
Attorneys for Applicant
by United States Patent Office
3,189,064
Patented June 15, 1965

3,189,064
SAW CHAIN
Robert E. Frederickson, South Gate, Calif., assignor to McCulloch Corporation, Los Angeles, Calif., a corporation of Wisconsin
Filed Oct. 15, 1962, Ser. No. 230,400
5 Claims. (Cl. 143—135)

This invention relates generally to saw chains and, more particularly, to a saw chain having an arrangement of cutters wherein the top forward leading transverse edges thereof comprise the cutting edges of the teeth that can be sharpened during cutting operations.

It is an object of the invention to provide an improved saw chain.

It is another object of the invention to provide a saw chain having all the advantages of a chisel-type tooth.

It is still another object of the invention to provide a saw chain having a plurality of cutters which may be sharpened and resharpened by grinding, filing or honing only the top surfaces of the tooth.

It is a further object of the invention to provide a router-type cutter having a cutting edge that feeds better into wood having various grain conditions than was heretofore possible.

It is a still further object of the invention to provide a more stable and smoother operating saw chain having a shorter sequence of cutters which makes possible a smoother sharpening operation on the top surface of the tooth during cutting operations.

It is another object of the invention to provide a saw chain of the self-shapening type, having a unique cutter tooth, which contributes to less wear on both the cutter tooth and the sharpening elements.

It is still another object of this invention to provide a saw chain having a cutter element beveled and sharpened at its top forward end to provide a surface which forms an angle of clearance with the adjacent face of a kerf being cut thereby.

It is a further object of the invention to provide a cutter element which is tilted rearwardly, downwardly at a greater angle than the angle of clearance as heretofore mentioned.

It is a still further object of this invention to provide a saw chain which is capable of being sharpened while running on the bar and sprocket of the chain saw and which is simpler in construction than other types of saw chains capable of being sharpened in this manner.

It is another object of this invention to provide a saw chain capable of being sharpened on top of the cutter teeth and which is more efficient and cleaner cutting than conventional top-sharpened saw chains.

It is still another object of the invention to provide a saw chain of this character wherein it is capable of maintaining adequate kerf width during the life of the saw chain.

It is a further object of the invention to provide a saw chain with a cutter element having a unique feature of a downwardly inclined portion in which the cutting edge is formed at the top front edge giving a greater freedom of clearance to the trailing portion of the cutting edge. This clearance can be adjusted to any desired angle depending upon the angle the cutting edge is sharpened.

It is a still further object to provide a saw chain that may be sharpened at either curved end of an operating saw chain as well as being sharpened by hand.

It is another object to provide a saw chain of this character that has cutters or cutting elements of unique shape and cutting action whereby jerkiness in operation is substantially eliminated. This results in longer chain life and and a more uniform cut of the kerf which also increases the length of time between sharpening operations.

Characteristics and advantages of the invention are further sufficiently referred to in connection with the following detailed description of the accompanying drawings, which represents one embodiment. After considering this example, skilled persons will understand that many variations may be made without departing from the principles disclosed and I contemplate the employment of any structures, arrangements or any modes of operation that are properly in the scope of the appended claims.

Referring to the drawings, which are for illustrative purposes only:

FIG. 1 is a top plan view of the saw chain shown in FIG. 2;

FIG. 2 is a side elevational view illustrating a sequence of cutters of a saw chain according to the invention;

FIG. 3 is a sectional view of one of the side cutters, taken on line 3—3 of FIG. 2; and FIG. 4 is a fragmentary side elevation showing a portion of a chain saw including a sharpening device and part of the chain saw sprocket broken away with the present invention, which is adapted for sharpening for this method.

Referring more particularly to FIGS. 1, 2 and 4, there is shown a portion of an endless saw chain comprised of center links 10, having sprocket drive lugs or tangs 11 of well-known character extending downwardly or vertically inwardly with respect to the endless chain. The tangs 11 are adapted to travel in a groove formed inwardly of the longitudinal edges on a saw bar 12 and being further adapted to be engaged in pockets 13 formed between the teeth of a driving sprocket 14 between two discs sandwiching the sprocket, the teeth of which drive the projections so as to operate the chain as shown in FIG. 4.

The center links 10 and the side links 16 are connected consecutively by transversely directed pintles or rivets 17 having hinged axes lying in the horizontal center plane a—a of the chain.

As also shown in FIGS. 1, 2 and 4, a selected side link 16a, being a right-hand cutter element generally indicated at 18, and a second selected side link 16b on the opposite side of said chain which is a left-hand cutter element, generally indicate at 20. The cutter elements 18 and 20 are arranged in consecutive allochiral relationship relative to each other, it being noted that the selected side links 16a and 16b are identical to each other with the exception that one is a right-hand link while the other is a left-hand link so that the description of one will suffice.

These selected side links are formed of a sheet material and include a vertical body or side link plate 22, enlarged adjacent to the ends, said enlarged ends having holes therein for the rivets or pintles 17. The forward end of the body portion is formed with a depth gauge, generally indicated at 24, having a shank portion 25 extending vertically outwardly from the body 22 and from the horizontal plane a—a of the chain a short distance below and ahead of the transverse cutting edge of the cutter, this distance being determined according to the depth of the cut desired. The depth guage 24 lies in the same plane as the main body or link plate 22 of the selected side link and is formed with a kerf-engaging outer arced surface 26.

Following the rear edge of the depth gauge 24 and being spaced therefrom by a recess is a cutter supporting means 30 which is also known as a body support portion or shank. The shank 30 is offset laterally from the plane of the side link plate 22, said offset being in the portion of the link indicated at 29, as shown in FIG. 3. From this offset portion, the shank 30 extends vertically outwardly from the general direction of the plane of the link body and laterally outwardly therefrom, and extends longitudinally to form an outside face 31 which trails inwardly from its forward edge to the rear edge thereof to provide adequate clearance during cutting operations in the kerf for the remainder of the chain and saw bar. A portion of the vertically forward facing edge portion of the shank or body portion 30 of the link is ground inwardly and sharpened as at 32. This sharpened edge is designed to form the side wall of the cut and determines the size of the kerf being cut thereby.

Supported on the outermost end of the support means 30 and extending transversely inwardly across the body portion 22 of the selected body link, and further extending over the longitudinal center plane b—b, is a cutter portion 34 which has a top and undersurface 35 and 36, respectively. The cutter portion 34 forms a plane which is tilted at an angle rearwardly toward the rear portion of the body or link plate portion 22. There is known in the art an area called the angle of clearance. This angle is formed between the top surface of a cutter portion and the adjacent base of a kerf being cut thereby and is determined by the angle in which the cutter portion lies, the average angle of a cutter being seldom greater than 7° to that of the base of the kerf because of the manner in which they are sharpened.

As shown in the drawings, the angle of the cutter portion 34 is greater than the average, being approximately 34° and substantially greater than the normal angle of clearance.

The angle of the cutter portion 34 of the present invention does not determine the angle of clearance, such angle of clearance being determined by the beveled surface 38 at the leading forward edge of the cutter portion 34 and the adjacent base 39 of the kerf 40 being cut, said angle of clearance being defined at A, as shown in FIG. 2. When the beveled surface 38 is sharpened automatically, as in a chain saw 42 as shown in FIG. 4, the beveled surface 38 is arcuately formed so that it may be positioned at an angle of clearance with respect to the kerf base 39 being cut.

At this point, it is to be understood that the beveled surface 38 may be sharpened by hand with a file as well as automatically as shown.

The leading edge margin of the beveled surface 38 converges and connects with the leading edge margin of the undersurface 36 to form the transverse cutting edge 44.

At this time it is important to note that due to the inclined angle of the cutter portion 34, the cutting edge 44 has been sharpened on an arc 46 leaving a curved outer surface having an equal radii of the arc 46, with the center located on a line, such as 47, perpendicular to the horizontal center plane of the saw chain and extending midway between the axes of the adjacent pair of pintles 17 so that the distance of the arcs of the beveled surfaces of the cutter edges and the depth gauge 24 from the horizontal plane of the chain is determined by their horizontal distance from the line 47. The cutting edges 44 are the same distance from the horizontal plane of the chain and, therefore, are the same horizontal distance from the axis of the respective pintles of the said links 16a and 16b, respectively. The same relationship exists with the respective depth gauges.

The particular design of the cutters and gauges, all being on an arc 48 of the saw chain having equal radii and which when rotated on the driving sprocket 14, as shown in FIG. 4, having the same center as the arc 48, makes it possible to sharpen the chain with a hone or grinding wheel 50 on the chain saw 42 in that each outer surface of each cutter and each depth gauge contacts the sharpening surface at the same distance from the center of the arc 48. This improves the speed and accuracy of sharpening saw chains and produces less wear on both the cutting portions of the cutting teeth and hone or grinding wheel not heretofore possible.

This means the sharpening, which is accomplished during the operation of the chain saw, automatically maintains the top clearance angle provided by the arced surface 46 on the top of the cutter, as shown in FIG. 2. Due to this sharpening method employed on this particular chain, the operator need not be concerned with the maintenance of a proper clearance rearwardly of the transversed cutting edge.

Since the top cutting edges 44 of the cutters perform most of the work during a cutting operation, they then need sharpening more often than do the side cutter edges 32 which may be sharpened with a hand file.

The invention and its attendant advantages will be understood from the foregoing description and it will be apparent that various changes may be made in the form, construction and arrangement of the parts of the invention without departing from the spirit and scope thereof or sacrificing its material advantages, the embodiment hereinbefore described being merely for the purposes of illustration, and I do not wish to be restricted to the specific form shown or uses mentioned, except as defined in the accompanying claims wherein various portions have been separated for clarity of reading and not for emphasis.

I claim:

1. In a saw chain having center links pivotally joined at their ends in succession to side links, certain of said side links being selected to form a cutting element, comprising:

(a) a flat link plate portion;
 (b) a shank portion extending vertically and laterally outwardly from the rear portion of said link plate portion, the lateral extent of the shank portion decreasing progressively from the forward edge to the rearward edge thereof and the forward edge of said shank portion being sharpened to cut the sidewall of a kerf, the shank portion being beveled laterally inwardly from the forward edge;
 (c) a cutter portion extending laterally inwardly from said shank portion, said cutter portion having first and second adjoining outer top surfaces and an under surface, said under surface extending laterally inwardly from said shank portion, said first top surface being beveled at its forward end to provide an outer surface which forms an angle of clearance with the adjacent kerf base being cut thereby, said under surface extending rearwardly under said first and second top surfaces for their combined full lengths, said cutter portion being tilted rearwardly toward said link plate portion at an angle greater than said angle of clearance, the tilt angle being in the direction of the second top and under surfaces; and
 (d) a cutting edge formed by the convergence of the leading edge of said beveled top surface with the leading edge of said under surface of said cutter portion.

2. In a saw chain having center links pivotally joined at their end in succession to side links, certain of said side links being selected to form a cutting element comprising:

(a) a flat link plate portion;
 (b) a shank portion extending vertically, outwardly, throughout its length from said link portion, the lateral extent of the shank portion decreasing progressively from the forward edge to the rearward edge thereof and offset from the vertical plane of the flat link plate, the forward edge of said shank portion being sharpened to cut a kerf sidewall;
 (c) a cutter portion supported on said shank portion, said cutter portion having first and second adjoining outer top surfaces and an undersurface, said first top surface being beveled at its forward end to provide an outer surface which forms an angle of clearance with the adjacent base kerf being cut thereby, said under surface extending rearwardly under said first and second top surfaces for substantially their combined full lengths, and said cutter portion further extending transversely, inwardly from said shank portion and being tilted rearwardly toward said body portion at an angle greater than said angle of clearance, the angle of tilt being in the direction of the second top and under surface;
(d) a cutting edge formed by the convergence of the the leading edge margin of said beveled surface with the leading edge margin of said undersurface of said cutter portion; and
(e) a depth gauge on said side plate positioned forwardly of said cutting edge and extending vertically, outwardly from said link plate to engage the base of the kerf.

3. In a saw chain having center links pivotally joined at their ends in succession to side links, certain of said side links being selected to form a cutting element, comprising:
(a) a flat link plate portion;
(b) a shank portion extending vertically, outwardly, throughout its length and offset from said link plate portion, the lateral extent of the shank portion decreasing progressively from the forward edge to the rearward edge thereof, and the forward edge of said shank portion being sharpened to cut a sidewall of a kerf;
(c) a cutter portion, supported on said shank, said cutter portion having first and second adjoining top surfaces and an undersurface, said first top surface being beveled in an arc at its forward end to provide a surface which forms an angle of clearance with the adjacent base of a kerf being cut thereby, and said cutter portion further extending transversely inwardly from the outermost portion of said shank portion and being tilted rearwardly, toward said body portion at an angle greater than said angle of clearance, said under surface extending rearwardly under said first and second top surfaces for substantially their combined full lengths;
(d) a cutting edge formed by the convergence of the leading edge margin of said beveled arc surface with the leading edge margin of said undersurface of said cutter portion and said cutting edge being transversed to the line of travel of the saw chain; and
(e) a depth gauge on said side plate positioned forward of said cutting edge and extending vertically from said link plate to engage the bottom of the kerf, said depth gauge being arced at its outermost surface, said arc being of the same equal radii as that of said beveled arc surface of said cutter portion, the center of said arc being centrally positioned relative to the hinge axis of the selected side links.

4. A cutter element for a saw chain comprising:
(a) a link body portion forming a side link of a saw chain;
(b) a cutter support means extending vertically outwardly from the rear upper portion of said link body portion, said support means being inclined inwardly from the forward edge to the rearward edge thereof;
(c) a side cutting edge formed on the forward leading edge of said cutter support means to a thereby cut the sidewall of a kerf;
(d) a cutter portion supported on said cutter support means positioned at the outermost end thereof and extending laterally inwardly therefrom, said cutter portion having first and second adjoining outer top surfaces and an under surface, said under surface extending laterally inwardly from said cutter support means, said first top surface being beveled at its forward end to provide an outer surface which forms an angle of clearance with the adjacent kerf base being cut thereby, said under surface extending rearwardly under said first and second top surfaces for their combined full lengths, said cutter portion being tilted rearwardly toward said link body portion at an angle greater than said angle of clearance, the tilt angle being in the direction of the second top and under surface; and
(e) a cutting edge formed by the leading edge of said top beveled surface joining the leading edge of said under surface.

5. A cutter element for a saw chain comprising:
(a) a side link body portion of a saw chain;
(b) a shank portion extending vertically outwardly from the rear upper portion of said link body portion, said shank being inclined inwardly from the forward edge to the rearward edge thereof;
(c) a side cutting edge formed on the forward leading edge of said shank portion to thereby cut the sidewall of a kerf;
(d) a cutter portion extending laterally inwardly from said shank portion, said cuter portion having first and second adjoining outer top surfaces and an under surface, said under surface extending laterally inwardly from said shank portion, said first top surface having an arcuate bevel at its forward end to provide an outer surface which forms an angle of clearance with the adjacent kerf base being cut thereby, said under surface extending rearwardly under said first and second top surfaces for their combined full lengths, said cutter portion being titled rearwardly toward said link body portion at an angle greater than said angle of clearance, the tilt angle being in the direction of the second top and under surface; and
(e) a cutting edge formed by the convergence of the leading edge of said beveled arcuate surface with the leading edge of said under surface of said cutter portion,
(f) said arcuate surface having its center centrally positioned relative to said link body portion.

References Cited by the Examiner
UNITED STATES PATENTS

| | | | |
|---|---|---|---|
| 2,725,083 | 11/55 | Ackley. | |
| 2,862,533 | 12/58 | Mall | 143—135 |
| 2,976,900 | 3/61 | Mills | 143—135 |
| 3,040,602 | 6/62 | Carlton | 143—32 |

WILLIAM W. DYER, Jr., *Primary Examiner.*

D. R. SCHRAN, *Examiner.*